(12) United States Patent
Varady

(10) Patent No.: US 6,174,339 B1
(45) Date of Patent: Jan. 16, 2001

(54) MULTIPLE SEPARATOR ARRANGEMENT FOR FLUID-PARTICLE SEPARATION

(75) Inventor: Victor A. Varady, Bartlett, IL (US)

(73) Assignee: UOP LLC, Des Plaines, IL (US)

( * ) Notice: Under 35 U.S.C. 154(b), the term of this patent shall be extended for 0 days.

(21) Appl. No.: 09/268,939

(22) Filed: Mar. 16, 1999

(51) Int. Cl.$^7$ .................................................. B01D 45/12
(52) U.S. Cl. ................................................ 55/348; 55/456
(58) Field of Search ........................... 55/345, 346, 347, 55/348, 456

(56) References Cited

U.S. PATENT DOCUMENTS

| | | | |
|---|---|---|---|
| 2,941,621 | 6/1960 | Dygert et al. | 183/92 |
| 2,986,278 | 5/1961 | Bjorklund | 209/144 |
| 3,061,994 | 11/1962 | Mylting | 55/346 |
| 3,415,042 | 12/1968 | Wilson | 55/348 |
| 3,433,361 * | 3/1969 | Ades | 55/348 |
| 3,443,368 | 5/1969 | Wilson et al. | 55/435 |
| 3,483,678 * | 12/1969 | Burdock et al. | 55/348 |
| 3,541,766 | 11/1970 | Wilson et al. | 55/348 |
| 3,541,768 | 11/1970 | Labadie | 55/419 |
| 4,863,500 | 9/1989 | Rombout et al. | 55/348 |
| 5,690,709 | 11/1997 | Barnes | 55/348 |

* cited by examiner

Primary Examiner—David A. Simmons
Assistant Examiner—Robert A. Hopkins
(74) Attorney, Agent, or Firm—John G. Tolomei; James C. Paschall

(57) ABSTRACT

An apparatus for the recovery of fine particulate material of the type that uses a tube sheet arrangement and a multiplicity of centrifugal separation devices provides improved separation by extending a skirt to confine a particle outlet stream and raise its superficial velocity. The separation arrangement partially confines a downwardly directed flow of particles and gas from the separator thereby raising the effective superficial velocity of the particle stream without increasing the portion of the gas steam that exits with the recovered particles. As a result the device provides a greater recovery of particles without increasing the quantity of gas that accompanies the separated fine particles without the need for complete confinement of the particles that exit the separator.

15 Claims, 3 Drawing Sheets

MULTIPLE SEPARATOR ARRANGEMENT FOR FLUID-PARTICLE SEPARATION

FIELD OF THE INVENTION

This invention relates generally to separators that use a plurality of tube-type separators to remove fine particulate matter such as catalyst particles or dust from a fluid such as hydrocarbon vapors or air. This invention relates more particularly to centrifugal separators that remove particulate material from high temperature fluid streams.

BACKGROUND OF THE INVENTION

Separators of the type that arrange a plurality of multiple tube-type separators in a parallel flow arrangement for removal of particular material from fluid streams are well-known. U.S. Pat. No. 2,941,621 and 2,986,278 and 3,061,994 generally disclose such separators and the individual tubular centrifugal separators contained therein. These arrangements house the inlets to the separators between upper and lower tube sheets that also retain upper and lower portions respectively of the tubular separation elements. Specific design criteria for such arrangements are well known. Other variations of the individual centrifugal separators and the separator layout itself can be found in U.S. Pat. No. 3,443,368 and 5,690,709.

These separators are commonly used to separate fine, particulate material from high temperature streams associated with the use of fine, particulate catalyst. One such process is the fluidized catalytic cracking process. The fluidized catalytic cracking of hydrocarbons is the principal process for the production of gasoline and light hydrocarbon products from heavy hydrocarbon charge stocks such as vacuum gas oils or residual feeds. The FCC process is carried out by contacting the hydrocarbon feed with a catalyst made up of a finely divided or particulate solid material. In the FCC process large hydrocarbon molecules associated with the heavy hydrocarbon feed are cracked to break the large hydrocarbon chains thereby producing lighter hydrocarbons. These lighter hydrocarbons are recovered as product and can be used directly or further processed to raise the octane barrel yield relative to the heavy hydrocarbon feed. The basic components of the FCC process include a reactor, a regenerator and a catalyst stripper. The reactor includes a contact zone where the hydrocarbon feed is contacted with a particulate catalyst and a separation zone where product vapors from the cracking reaction are separated from the catalyst. The catalyst is transported like a fluid by passing gas or vapor through it at sufficient velocity to produce a desired regime of fluid transport. During the cracking reaction, coke will be deposited on the catalyst. Coke interferes with the catalytic activity of the catalyst by blocking active sites on the catalyst surface where the cracking reactions take place. Catalyst is traditionally passed to a regenerator for purposes of removing the coke by oxidation with an oxygen-containing gas. Oxidizing the coke from the catalyst surface releases a large amount of heat, a portion of which escapes the regenerator with gaseous products of coke oxidation generally referred to as flue gas.

The flue gas generated by combustion of coke from the FCC catalyst produces a high temperature gas stream that, after passage through cyclone, still retains a substantial amount of fine catalyst particles that must be removed prior to further treatment or energy recovery from the flue gas. The multiple tubular separator arrangements are particularly suited to the removal of this very fine particulate material.

Application of multiple tubular separators for removal of dust and particulate material from such high temperature fluid streams has required further consideration and special arrangements. FIGS. 1 through 3 of U.S. Pat. No. 4,863,500 and of U.S. Pat. No. 3,541,766 each show a separator arrangement that is suitable for the usual high temperature operations of processes such as the FCC process. The three different arrangements of U.S. Pat. No. 3,541,768 and 3,415,042 each suspend multiple centrifugal separators from an inner housing to accommodate different expansion rates between the internals of the separator and an outer housing. Internal insulation normally covers the inside of the outer housing to reduce its wall temperature thereby increasing its strength for pressure containment, but reducing its expansion relative to the internals.

FIGS. 1 and 3 of both of the above patents show a completely closed inner housing contained within an outer housing vessel. In these two arrangements the inner housing retains the separation elements in a closely conformed housing that introduces a number of design complexities to the overall arrangement. Complexities associated with these arrangements involve the use of expansion elements, additional inlets or outlets, and purge requirements for retaining all of the separate centrifugal separators in a completely enclosed housing. In some cases the complexity of the separators can impose additional pressure drop from the total system.

FIG. 2 of the '766 patent and of the '042 patent shows a less confined separator arrangement. The generally simplified arrangement of the separator shown in FIG. 2 has lead to its adoption in different forms in most commercial applications.

To provide flexibility for the radial growth of the tube sheets supporting the tubular separators, the more open separator arrangement results in a significant space between the wall of the containment vessel and the closest outlet of the tubular separators. Up until this time, the containment of the gas stream below the outlets of the tubular separators in this type of arrangement has received little attention. This is particularly true in the arrangement of the more open-type separator as shown in the above mentioned FIG. 3.

It is a constant goal in the use of the multiple tube separators to improve separation efficiency. Separators will usually operate with a separation efficiency of over 60%—with some providers of such separators claiming efficiencies up to 90%. The separation efficiency is defined as the difference between the particles entering the separator and the particles leaving through the fluid outlet of the separator divided by the rate of particles entering the separator. The efficiency related to selected particle size ranges and the overall efficiency are both important for evaluating the operation of a separator with the efficiency in particular particle size ranges being particularly important in many applications.

BRIEF DESCRIPTION OF THE INVENTION

Surprisingly, it has now been discovered that the separation efficiency of a separator vessel that suspends multiple, tubular separators from a tube sheet for open discharge into a containment vessel can have improved overall recovery of particulate material, and more importantly, this improvement may be attained over particular particle size ranges. This invention confines the discharged particles and fluid from the outlets of the multiple, tubular separators as the mixture passes to a lower outlet. This type of containment improves the recovery of particles without diverting a greater fraction of the total gas flow from the main gas outlet to the particle outlet of the separation vessel. In addition, the improved containment does not restrict the free downward or radial expansion of the suspended tube sheet arrangement. Recovering additional particulate material without increasing the flow of fluid to the particle outlet improves the separator operation by minimizing the amount of fluid that exits with particles and which requires special recovery or recycle. This separation efficiency is attained without the added complexity of the more closed systems that inherently confine the discharge particles and fluids from the outlets of the tubular separators.

Reducing the flow area for the particle and fluid mixtures that exit the tubular separators increases the superficial velocity of the combined mixture stream as it passes to the outlet of the separator vessel. Until this discovery, it was not appreciated that the increase in diameter of the containment vessel, necessary for thermal expansion of the tube sheet and normal vessel maintenance, abruptly increased the area for the mixture thereby interfering with the separation efficiency. Extending a confining skirt downwardly, below the outlets of the tubular separators, raises the superficial velocity of the combined stream by 36% or more in a typical separator arrangement. Raising the superficial velocity in the zone below the particle outlets of the separators is particularly effective in increasing the removal of particles having a size greater than two microns. Confinement of the particle mixture below the separator outlets will usually maintain a superficial velocity of the mixture of at least 0.15 ft/sec and more preferably of at least 0.2 ft/sec.

The apparatus of this invention is particularly useful to modify the operation and arrangement of existing separator units. Modification of existing separators requires minimal retrofitting and can usually be accomplished through modifications made in the field.

Accordingly, in a broad apparatus embodiment, this invention is an apparatus for separation of fine particulate material from a fluid stream. The apparatus comprises a vessel having a vessel inlet and a fluid outlet, both an upper and a lower chamber closure partially defining a separation chamber, a plurality of centrifugal separators, and a skirt bordering the perimeter of multiple discharge openings of the separators. The vessel defines a fluid outlet, a bottom closure, and a vessel inlet which receives an input stream. The vessel inlet receives an input stream which contains particulate material and the fluid outlet discharges a principally fluid stream of particulate material having a reduced concentration relative to the input stream. The bottom closure defines a bottom outlet stream for a particulate stream which contains solids which were removed from the input stream. The bottom closure also defines at least the bottom of a particulate collection chamber. Within the separation vessel, an upper and a lower chamber closure partially defines a separation chamber which communicates with the vessel inlet and the fluid outlet. A plurality of centrifugal separators is located at least partially in the separation chamber. Each of the centrifugal separators defines a separator inlet, a separator outlet, and a solids discharge opening. The separator inlet communicates with the vessel inlet to receive the input stream. The separator outlet communicates with the fluid outlet to discharge a principally fluid stream having a reduced concentration of particulate material relative to the input stream. And the solids discharge opening downwardly discharges particulate material into the particle collection chamber. The skirt extends below the discharge openings that it surrounds and defines a bottom outlet which is in direct communication with the solids outlet through the particle collection chamber.

In a more limited embodiment, this invention is an apparatus for separating particulate material from a fluid stream that comprises a vessel which defines both a vessel inlet and a fluid outlet and which has a tapered bottom closure, a separator chamber, a plurality of centrifugal separators, and a skirt bordering the perimeter of the particle outlets for the separators. The vessel inlet receives an input stream which contains particulate material. The fluid outlet discharges a principally fluid stream having a reduced concentration of particulate material relative to the input stream. The tapered bottom closure defines a solids outlet for a stream which contains an increased concentration of solids relative to the input stream. The separation chamber is located within the vessel, is defined at least in part by an upper tube sheet and a lower tube sheet, and has a chamber inlet which is in isolated communication with the vessel inlet. The centrifugal separators are located at least partially within the separation chamber and spaced apart horizontally as an array of separators. Each centrifugal separator has an upper end fixed to the upper tube sheet, a lower end fixed to the lower tube sheet, a separator inlet positioned within the separation chamber for communication with the chamber inlet, a separator outlet extending above the upper tube sheet to communicate with the fluid outlet, and a particle outlet extending below the lower tube sheet for communicating particles downwardly to the particle outlet. The skirt which borders the perimeter of particle outlets in the array of separators extends below every particle outlet by a distance of at least 6" and defines a skirt opening at the bottom of the skirt in direct communication with the tapered bottom closure and the solids outlet.

Other advantages, aspects, embodiments and details of this invention are set forth in the following detailed description of the invention.

DETAILED DESCRIPTION OF THE INVENTION

The arrangement of this invention can improve the operation of separators that use an open tube sheet arrangement of multiple tubular separators. This invention can use any type of multiple separator that has a downward discharge of removed particles and fluid that will benefit from increased superficial velocity below the outlet of the tubular separators. Multiple tube separators of this type will usually house anywhere from 48 to 160 individual separation tubes with the number of individual tubes typically ranging from 60 to 120. A typical swirl tube will have a maximum height of about 48 inches and a maximum diameter of from 8 to 10 inches. The typical pressure drop across the individual tubular separators is normally about 1.5 psi and total pressure drop across the entire separation system averages about 2.5 psi. Separators used with this invention will typically remove particles having a size of 25 microns and smaller. The preferred applications of this invention may remove particles in a size range of from 20 to 5 microns and more preferred applications may remove particles in a size range of from 15 to 7 microns.

Figure 1:
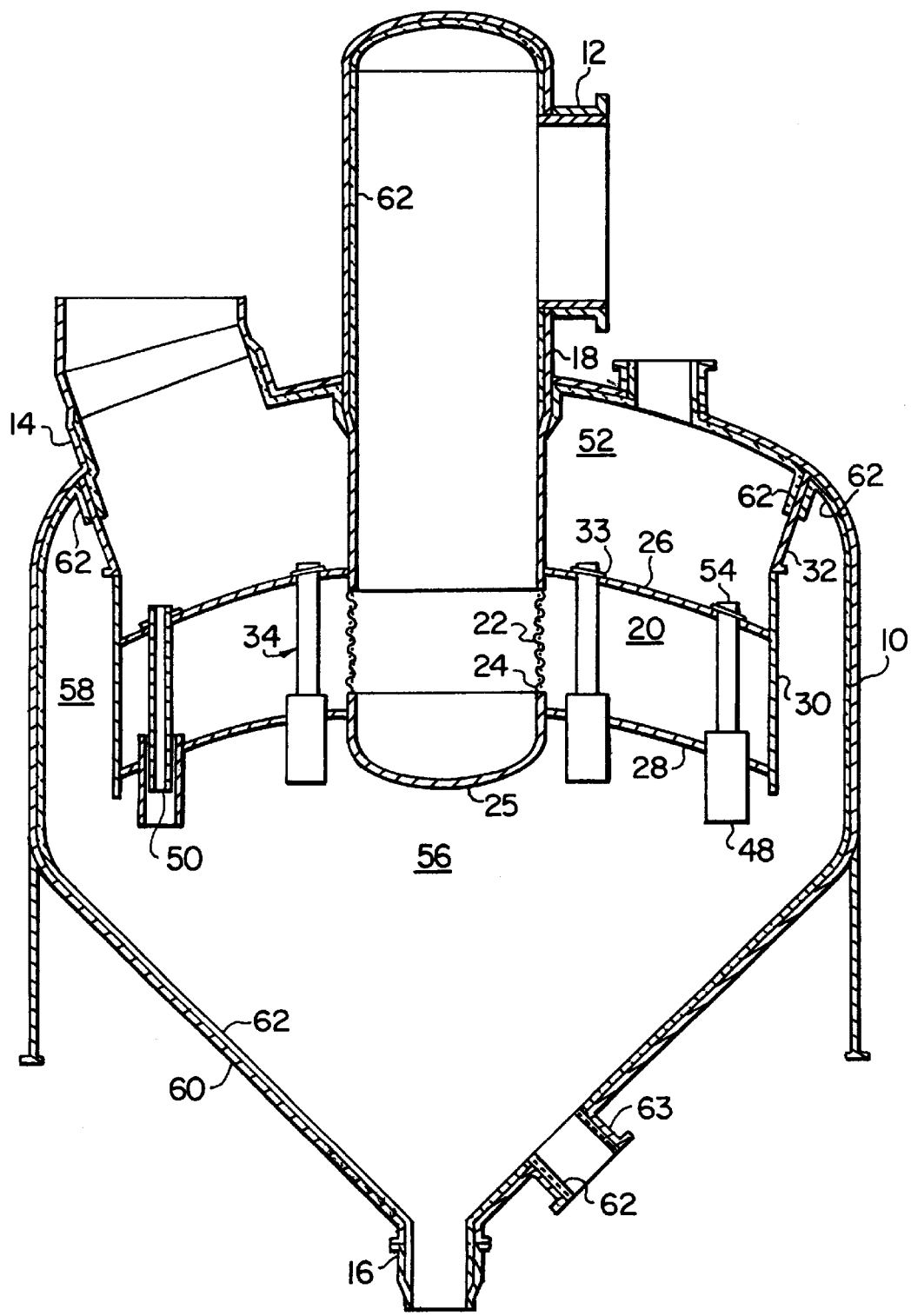
FIG. 1 is a cross-section elevation of a typical arrangement of a separator as used in the prior art.

FIG. 1 shows the general arrangement for a typical separator that may be improved by this invention. In a typical arrangement, a vessel 10 has an inlet 12 for receiving a mixture of fluids and particles that the separator 10 divides into a principal fluid stream having a reduced concentration of particles relative to the input stream that exits through a fluid outlet 14 and a stream containing an increased concentration of solids, relative to the input stream, that exits through a solids outlet 16. A conduit 18 delivers the input stream from nozzle 12 into a separation chamber 20 across a chamber inlet 22. A screen element 24 covers inlet 22 and blocks the entrance of oversize material into chamber 20 The bottom of conduit 18 has a dished bottom 25 that serves as a well for retaining oversize material. An upper tube sheet 26 and lower tube sheet 28 form the top and bottom respectively of separation chamber 20.

A circular cylinder 30 encloses the outside of chamber 20 and depends from a frustro-conical support 32 that is rigidly attached to separation vessel 10. Circular cylinder 30 has freedom to expand downwardly and outwardly. An annular space 58 surrounds cylinder 30 to permit free radial growth of the tube sheet and tubular separator internals relative to the wall of vessel 10. Vertical clearance between a bottom closure 60 of vessel 10 and the bottom of an outlet tube 40 or circular cylinder 30 permits the cylinder and tube sheet assembly to freely expand in a downward direction.

The difference in thermal expansion between the cylinder walls and the tube sheet elements usually results from relative cooling of the walls of vessel 10 with respect to the internals of the separator. FIG. 1 shows a layer of insulation 62 that shields the externally exposed elements of vessel 10 from the full internal temperature of the fluid stream passing through the vessel. Such cooling is usually necessary to give the metal defining the vessel adequate strength to withstand the internal pressure that it contains.

This invention is especially useful where the processing of high temperature fluids results in the use of an internally insulated vessel. Such thermal design considerations typically become important in the design of a separator that processes a fluid at temperatures of more than about 500° F.

Figure 2:
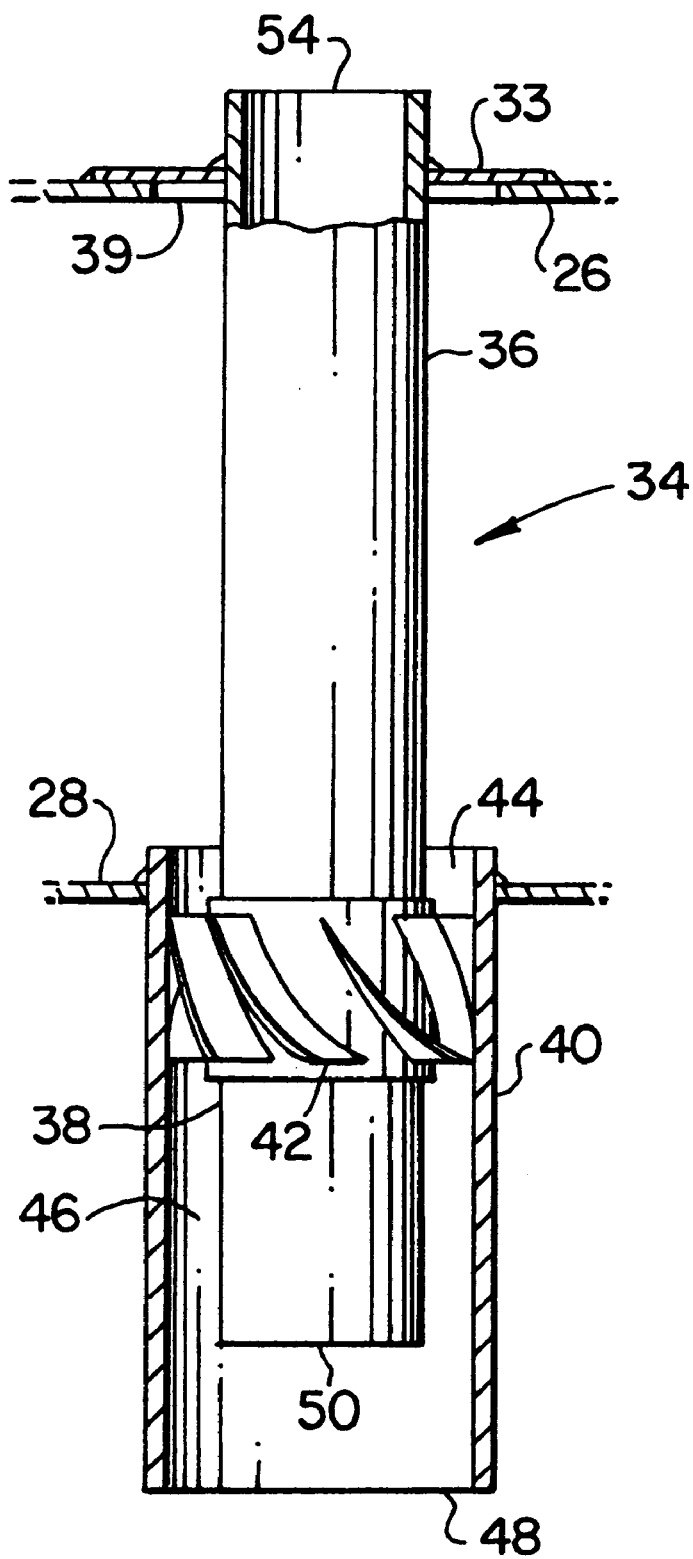
FIG. 2 is an enlarged cross-section of a typical tubular separation element used in the separator of FIG. 1.

Tubular separation elements 34 vertically bridge the space between tube sheets 26 and 28 of chamber 20. As shown more clearly by reference to FIG. 2, a fluid tube 36 of tubular separator element 34 depends from an attachment plate 33 that is sealed to fluid tube 36 about an inner edge and rests on the top of upper tube sheet 26 with a seal to the tube sheet 26 about its opposite edge. Ring 33 covers an enlarged hole 39 that is used to install fluid tube 36 from a collection chamber 52 located above upper tube sheet 26. Once installed, an outlet tube 40 surrounds the lower portion 38 of fluid tube 36 and the outer portion of a vane assembly 42 that encircles the portion 38 of fluid tube 36. Sealed attachment of outlet tube 40 fixes it to lower tube sheet 28 and positions outlet tube 40 relative to the fluid tube 36. An annular space between outlet tube 40 and fluid tube 36 defines an inlet 44 for tubular separator element 34 to receive its distributed share of the inlet stream comprising the particle-containing fluid. As the input stream passes downwardly through the vane element 42, centripedal acceleration of the particle containing fluid forces the heavier, particulate material towards the outside of outlet tube 40 and to the outside of annular space 46. The particles and a small portion of the fluid exit a bottom outlet 48 of outlet tube 40.

The majority of the fluid stream changes direction and flows upwardly into an inlet 50 and through fluid tube 36. Collection chamber 52 collects the particle de-entrained fluid from outlets 54 of fluid tubes 36. Fluid flows out of chamber 52 via nozzle 14. Particulate material and the underflow fluid pass downwardly through a particle flow chamber 56 and out of a separator through solids outlet 16.

Figure 3:
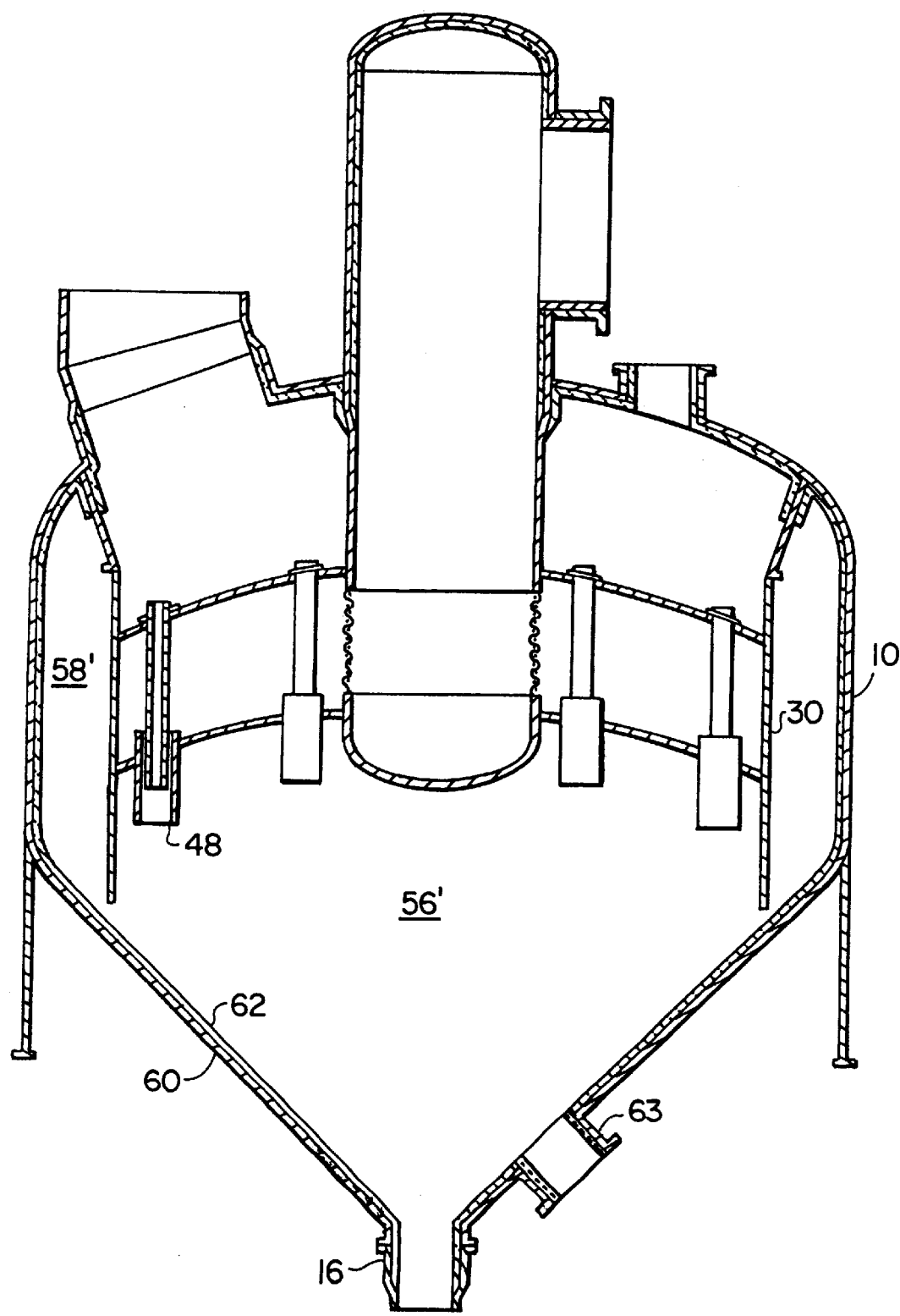
FIG. 3 is a cross-section of a separator as shown in FIG. 1, but modified in accordance with this invention.

FIG. 3 shows the improvement of this invention where an extended band of cylinder 30 provides a skirt section 64 bordering the outer perimeter of the discharge openings 48 and extending below the discharge openings that effectively reduces the diameter of particle flow area 56 '. Providing a standard skirt section 64 cuts off the volume of vessel 10 below the discharge openings 48 and isolates an extended annular volume in an annular space 58'. The bottom of skirt extension 64 is spaced away from the bottom enclosure 60 and the insulation 62 by approximately the minimum distance needed for radial and downward expansion of the skirt section 64. For most arrangements, vertically off-setting the skirt from the lining of the pressure vessel wall by a minimum of 3 inches will provide adequate clearance for thermal expansion during high temperature operation. Any remaining gap between the bottom of extended skirt 64 and the bottom closure 60 will have minimal impact on the superficial velocity since the portion of the bottom enclosure adjacent to the bottom of skirt will have about the same diameter as the skirt bottom. It may also be desired to provide some minimum clearance between the periphery of outlet tube 40 and the inside of skirt 64. Such clearance will usually be in a range of about 3 inches and aids in establishing a regular vortex pattern below outlet 48.

In regard to the vortex pattern, the vortex-type flow of fluid that is established by vane element 42 typically extends below outlet 48 as the fluid changes direction. It is believed that the added confinement and increased superficial velocity, provided by this invention, restricts the vortex from expansion below the outlet 48 while at the same time pulling particles from the reversing fluid stream thereby improving the separation efficiency. Maintaining an undisturbed vortex pattern immediately below outlet 48 is also believed to be beneficial in improving the separation efficiency and the skirt 64 will typically provide a uniform diameter section that extends at least 6 inches and more preferably at least 12 inches below the lowest outlet 48.

For structural reasons the tube sheets 26 and 28 that support the separators supports will usually have a curved shape. Normally the bottom of the outlet tubes 40 are spaced a uniform distance from where the center-line of the outlet tube 40 intersects the tube sheets. Uniform extension of outlet tubes 40 below their tube sheet intersection point locates their outlets 48 at different elevations. At minimum, skirt 64 extends below the lowermost outlet 48 of the outlet tubes 40.

The annular space 58 provided between the outside of circular cylinder 30 and the inside vessel 10 is routinely made larger than necessary for thermal growth purposes to provide inspection and/or service access to the insulating lining 62. Similarly the spacing between the bottom of circular cylinder and the bottom closure 60 is often sized to permit visual inspection and/or service of the refractory from the bottom of annular space 58 by a person who enters discharge space 56 through the access nozzle 63. The practice of this invention need not prevent such access and annular space 58 may be made accessible by providing bolted sections of skirts 64 which are suitable for temporary removal during inspection or service. Where removable sections will provide access, the skirt will preferably have a minimum vertical dimension of at least 18 inches. Alternately, additional access nozzles, as represented by number 63 in the drawings may be provided in the side of vessel 10.

While this description has shown a skirt extension to provide the confinement, the function of the skirt extension may be provided by other means known to those skilled in the art. For example additional refractory or other filling material may reduce the diameter of the separation vessel to approximately that of the outlets 48 and thereby provide the same function of the extended skirt. The diameter of the filler material would only be increased by the minimum amount necessary to provide the necessary radial growth of the lower tube sheet. Such filler material can comprise a builtout portion of insulation 62 or other suitable lining. In this manner the overall arrangement of the separator materials remains relatively simple and the benefits of the invention are achieved without extending the skirt per se.

effect of increasing the downward superficial velocity by confining the cross-sectional area to that of the ID of the skirt that surrounds the swirl tube outlets. The reduction in diameter increases the superficial velocity to 0.17 ft/sec. The table shows the resulting decrease in the particle loading in the flue gas as it leaves the separator as a result of the increased superficial velocity. Looking at the entire particle loading, the invention has the advantage of increasing the overall efficiency to 67.4 or by about 10% over the efficiency of case 1. More importantly, when looking at individual efficiencies associated with particle sizes, case 2 provides a more substantial increase in the efficiency of the particle

TABLE

| PARTICLE | INLET | | CASE 1 OUTLET | | | CASE 2 OUTLET | | | WEIGHT RATIO OUTLET CASE 1 |
|---|---|---|---|---|---|---|---|---|---|
| SIZE $\mu m$ | WEIGHT % | LB/HR | WEIGHT % | LB/HR | EFFICIENCY | WEIGHT % | LB/HR | EFFICIENCY | OUTLET CASE 2 |
| 14.7 and up | 36.16 | 49.43 | 10.23 | 5.42 | 89.0 | 2.22 | .99 | 98.0 | 5.5 |
| 12.4 to 14.7 | 2.33 | 3.17 | 0.82 | .44 | 86.4 | .20 | .09 | 97.0 | 4.5 |
| 7.2 to 12.4 | 7.84 | 10.71 | 2.80 | 1.48 | 86.2 | 1.68 | .75 | 93.0 | 2.0 |
| 4.2 to 7.2 | 6.50 | 8.88 | 2.14 | 1.12 | 87.3 | 5.00 | 2.23 | 75.0 | 0.5 |
| 2.8 to 4.2 | 9.50 | 12.98 | 9.07 | 4.81 | 63.0 | 11.68 | 5.20 | 60.0 | 0.9 |
| 1.4 to 2.8 | 13.25 | 18.12 | 19.61 | 10.38 | 42.7 | 24.38 | 10.87 | 40.0 | 1.0 |
| 0.9 to 1.4 | 8.58 | 11.73 | 19.28 | 10.20 | 13.0 | 18.39 | 8.20 | 30.0 | 1.2 |
| 0.0 to 0.9 | 15.84 | 21.65 | 36.05 | 19.07 | 11.9 | 36.45 | 16.25 | 25.0 | 1.2 |
| TOTALS | 100.00 | 136.6 | 100.0 | 52.9 | | 100.00 | 44.5 | | |

EXAMPLES

EXAMPLE

In order to demonstrate the advantages of increasing superficial velocity in accordance with this invention, two separators are designed to process 295,000 lbs/hr of an FCC flue gas having fines loading as shown in Table 1 and broken down by size distribution. The following example is based on engineering design calculations and empirical data from experimental modeling and operating separators. In both cases, the separator has a configuration as generally shown in FIG. 1. The separator contains 64 swirl tubes and has a vessel diameter of 20'2½" and a skirt diameter of 15'3". The flue gas enters the separator at a temperature of 1250° F. and a pressure of 35 psi. The average molecular weight of the flue gas stream is 29.2. The cross-sectional area of the inside of the separator vessel is approximately 321 ft$_2$. The inside of the skirt has a cross-sectional area of approximately 183 ft$^2$.

Case 1

The separator operated in case 1 to simulate the relatively lower superficial velocity that would occur when the fluid and particle mixture (also referred to as the underflow) leaving the outlets of the swirl tubes passes into the cross-sectional area of the separator below the swirl tube outlets. Approximately 3% of the entering flue gas stream or 8850 lb/hr exits the separator as the underflow stream that contains the particles removed from the flue gas stream. On a volumetric basis this produces a flow rate of about 31 ft$^3$/sec and reduces the superficial velocity to 0.097 ft/sec. in the region below the outlets. The table lists the wt % and lbs/hr of particles remaining in the flue gas stream after it leaves the flue gas outlet of the separator. The overall efficiency for the separation is about 61.3. The table also lists a breakdown by particle size.

Case 2

To demonstrate the benefit of extending the skirt downwardly below the swirl tube outlets, this case shows the removal for the larger particle sizes. More dramatically, the ratio of the remaining particles in the largest particle size range is relatively high. Removal of particles having sizes of about 15 microns and up is a very significant improvement since these particles have the greatest propensity to damage equipment that is used for the further processing of the flue gas downstream of the separator. Removal of particles in the 12.4 to approximately 15 micron size range is also significant and is also accomplished to a much higher degree in case 2. Particle removal in the size range of from 7.2 to 12.5 microns removal is also important and improves significantly in case 2. The removal of particles in the size range of about 4.2 to 1.4 microns is not as important for most flue gas operations while the removal of particles having sizes of below about 1.4 microns is of little consequence. Accordingly, the operation represented by case 2 shows a very beneficial decrease in particles that escape with the flue gas from the separator and that are in the most beneficial size ranges for removal.

What is claimed is:

1. An apparatus for separating particulate material from a fluid stream, said apparatus comprising:

a) a vessel defining a vessel inlet for receiving an input stream containing particulate material, a fluid outlet for discharging a principally fluid stream having a reduced concentration of particulate material relative to the input stream, and a bottom closure, the bottom closure defining a bottom outlet for a particle stream containing the solids removed from the input stream and defining at least the bottom of a particle collection chamber;

b) an upper chamber closure and a lower chamber closure at least partially defining, within the separation vessel, a separation chamber in communication with the vessel inlet and fluid outlet;

c) a plurality of centrifugal separators located at least partially in the separation chamber, the centrifugal separators each defining a separator inlet in communication with the vessel inlet for receiving the input stream, a separator outlet in communication with the fluid outlet for discharging a principally fluid stream having a reduced concentration of particulate material relative to the input stream, and a solids discharge opening for downwardly discharging particulate material into the particle collection chamber; and d) a vertically extending wall comprising a cylindrical skirt bordering the perimeter of multiple discharge openings and extending below the discharge openings that it surrounds to define a bottom outlet in direct communication with the solids outlet through the particle collection chamber.

2. The apparatus of claim 1 wherein the vertically extending wall extends in a substantially vertical direction for a distance of at least 6 inches below the discharge openings.

3. The apparatus of claim 1 wherein said centrifugal separator comprises a swirl tube.

4. The apparatus of claim 1 wherein an the upper closure comprises an upper tube sheet that defines the top of the chamber, the lower closure comprises a lower tube sheet that defines the bottom of the chamber, the centrifugal separators extends vertically between the upper and lower tube sheets, the discharge outlet extends below the lower tube sheet and the separator outlet extends above said upper tube sheet.

5. The apparatus of claim 1 wherein the skirt comprises a circular cylinder that extends from the bottom closure and surrounds all of the discharge openings.

6. The apparatus of claim 5 wherein the skirt extends at least 12" below the bottom of the discharge openings.

7. The apparatus of claim 1 wherein the solids outlet is centered directly underneath the bottom outlet.

8. An apparatus for separating particulate material from a fluid stream, said apparatus comprising:

a) a vessel defining a vessel inlet for receiving an input stream containing particulate material, the vessel defining a fluid outlet for discharging a principally fluid stream having a reduced concentration of particulate material relative to the input stream, and having a tapered bottom closure defining a solids outlet for a stream containing an increased concentration of solids relative to the input stream;

b) a separation chamber located within the vessel and defined at least in part by an upper tube sheet and a lower tube sheet, the separation chamber having a chamber inlet in isolated communication with the vessel inlet;

c) a plurality of centrifugal separators located in the separation chamber and spaced apart horizontally into an array of separators, each centrifugal separator having an upper end fixed to the upper tube sheet, a lower end fixed to the lower tube sheet, a separator inlet positioned within the separation chamber for communication with the chamber inlet, a separator outlet extending above the upper tube sheet for communicating with the fluid outlet and a particle outlet extending below the lower tube sheet for communicating particles downwardly to the particle outlet; and, d) a skirt bordering the perimeter of particles outlets in the array of separators, extending below every particle outlet by a distance of at least 6", and defining a skirt opening at the bottom of the skirt in direct communication with the tapered bottom closure and the solids outlet.

9. The apparatus of claim 8 wherein the horizontal distance between the skirt and the nearest particle outlet does not exceed 3".

10. The apparatus of claim 8 wherein the distance from the tapered bottom surface to the bottom of the skirt does not exceed 6".

11. The apparatus of claim 8 wherein the tapered surface comprises a conical surface.

12. The apparatus of claim 8 wherein the centrifugal separator comprises a swirl tube.

13. The apparatus of claim 8 wherein the skirt comprises a circular cylinder that surrounds the upper and lower tube sheets.

14. The apparatus of claim 8 wherein the skirt has a distance of at least 12" below the bottom of the particle outlets.

15. The apparatus of claim 8 wherein the solids outlet is centered directly underneath the skirt opening.

* * * * *